J. B. THOMPSON.
Apparatus for Desiccating Eggs.
No. 53,361.            Patented March 20, 1866.
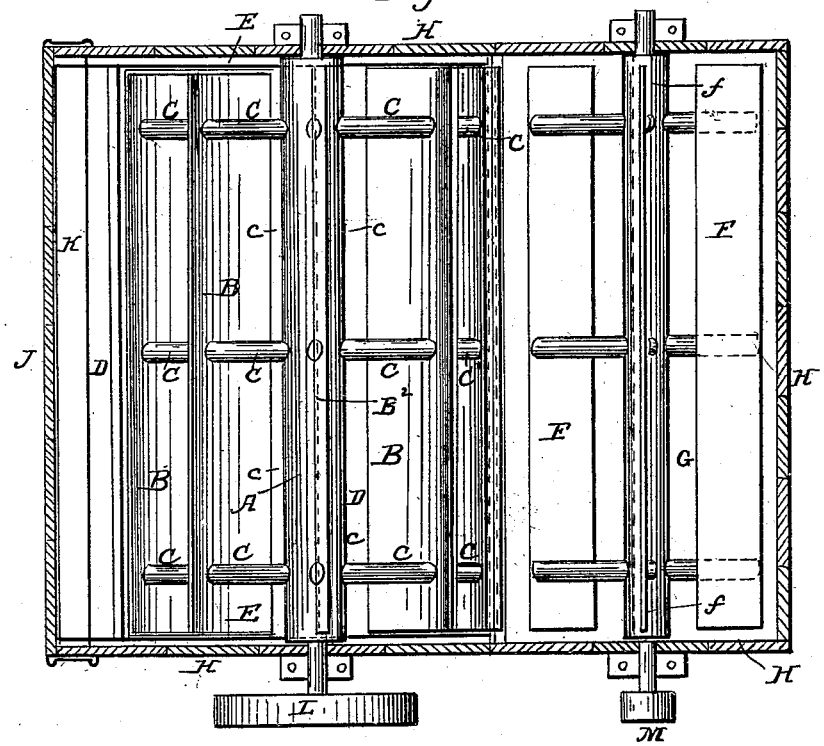
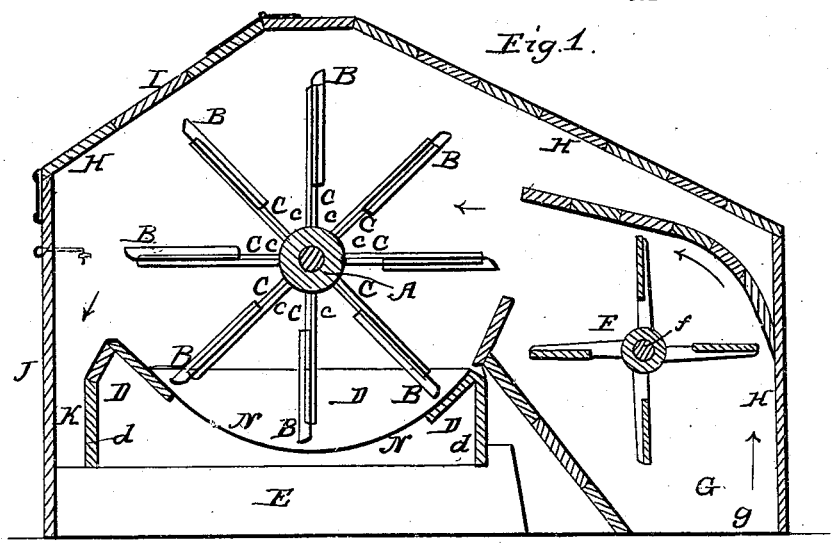

UNITED STATES PATENT OFFICE.

J. B. THOMPSON, OF NEW YORK, N. Y.

IMPROVED APPARATUS FOR DESICCATING EGGS, &c.

Specification forming part of Letters Patent No. 53,361, dated March 20, 1866.

*To all whom it may concern:*

Be it known that I, Dr. J. B. THOMPSON, in the city, county, and State of New York, have invented a new and Improved Machine for Desiccating Eggs, Tomatoes, &c.; and I do hereby declare that the following is a full, clear, and exact description thereof, which will enable those skilled in the art to make and use the same, reference being had to the accompanying drawings, forming part of this specification.

The purpose of the present invention is to produce a machine or apparatus in and by which eggs, tomatoes, and other substances can be "desiccated," so called—that is, properly prepared for transportation to distant places, and so as to enable them to be kept or preserved for use in climates and under conditions unfavorable for their preservation in their natural state.

It consists in the use of a series of shallow buckets or pans attached to and upon a common revolving shaft, in connection with a suitable trough or pan for holding the eggs, tomatoes, or other substance or substances to be desiccated, the two being placed within a proper-shaped outer casing or box and so arranged therein with regard to each other that, as the buckets or pans revolve, they shall, in turn, dip up some portion of the substance placed in the trough, which, as each bucket approaches a vertical position, or nearly so, falls therefrom down into the trough again, and so on, as long as may be necessary, while, at the same time, heated air is being supplied to and thoroughly diffused through the interior of the box incasing the revolving buckets, and in sufficient quantities to exhaust the moisture from the substance and thus dry or desiccate the same, finally passing out through suitable outlets therefor in the lower portion of the box.

In accompanying plate of drawings my improved desiccating-machine is illustrated, Figure 1 being a central transverse vertical section of the same, and Fig. 2 a plan or top view with the outer casing in horizontal section.

H H in the drawings represent the box or casing of the apparatus or machine, in which, turning in suitable bearings of each of its end pieces, is hung a horizontal shaft, A, having a series of short radial arms, C C C, and to and upon every three of which in the same plane are secured a series of shallow buckets or pans B B B, &c., made either of sheet-iron, tin, zinc, copper, or any other suitable metal or material, and of nearly the same length as that of their common shaft, but of less width than the length of the radial arms C, leaving an open space, $c$, between each of their inner edges and the periphery of the shaft. These buckets have their outer and end edges turned or bent up into a pan shape, as seen in Fig. 1.

D, the trough to receive the eggs, tomatoes, or other substance or substances to be desiccated, made of a circular shape in its cross-section, corresponding to the circle described by the buckets in their revolution, and of a little greater length upon its inside than the buckets, and of metal or other suitable material. This trough is secured in any proper manner to a frame, $d$, and is placed in position under the revolving buckets after having been first sufficiently filled with the substance to be desiccated, by removing the side piece, J, of the outer casing, H, and then sliding it upon the rails E E upon the inside of each end piece of the box, when the side J is placed in its original position and there secured in any proper manner by means of hooks, &c.

F is a revolving fan, extending lengthwise across the box and turning, by its shaft $f$, in suitable bearings thereof, and in an interior channel or chamber, G, of the same, communicating at the lower end through the opening $g$ with any proper heating apparatus.

On outer end of bucket-shaft A is a pulley, L, connected by a band with another but considerably smaller pulley, M, upon the shaft $f$ of the fan, whereby, by turning the pulley L in any proper manner, the pulley M is also revolved, as is evident without further description.

The substance to be desiccated having first been put into the trough D, and it then placed in the box or casing, as before described, the shaft A with its series of buckets attached to it is then revolved, its buckets in turn passing through the substance in the trough and each one dipping or lifting a portion of it upon their surfaces, from which it finally drops down into the trough again as the buckets approach a vertical position, or nearly so, and so on as long as desired or necessary. At the same time, with the revolution of the buckets and the dipping up thereby of the substance in the trough, the fan is caused to revolve with great rapidity in the proper direction to generate a strong current of heated air from the heating apparatus to the interior of the outer casing or box, through which it thoroughly diffuses itself and circulates, thereby absorbing and drying the moisture contained in the substance being prepared, and finally passing out of the machine through any suitable apertures at or near the lower portion thereof. This operation is continued until the substance has been sufficiently dried, when it is then removed by first detaching the side plate, J, so as to allow the trough to be pulled out of the casing from which, as well as from any other portions of the apparatus, the substance desiccated is scraped or otherwise properly removed, when the machine can be again used as before, first sufficiently filling the trough with the substance to be operated upon or prepared.

The interior portions or surfaces of the apparatus about and on which the substance, as it is being desiccated, collects and adheres, I intend to make of or coat with any suitable and proper metal or material therefor.

I claim as new and desire to secure by Letters Patent—

1. The general arrangement of the apparatus herein described, the same consisting in the use of a series of buckets or pans attached to a common revolving shaft and moving in and through the substance or substances to be desiccated, placed in the trough or receptable therefor, in combination with any suitable device or devices for generating a current or currents of heated air through the chamber in which the buckets revolve, substantially as and for the purpose specified.

2. The combination of the revolving buckets B B and trough or receptacle D, arranged together, substantially in the manner described, and for the purpose specified.

J. B. THOMPSON.

Witnesses:
ALBERT W. BROWN,
M. M. LIVINGSTON.